455/12

BURST SYNCHRONIZATION METHOD AND APPARATUS

Filed Oct. 30, 1968 3 Sheets-Sheet 1

INVENTOR
LEONARD SHELDON GOLDING

BY Sughrue, Rothwell, Mion, Zinn & Macpeak
ATTORNEYS

INVENTOR
LEONARD SHELDON GOLDING

BY Sughrue, Rothwell, Mion, Zinn & Macpeak

ATTORNEYS

3,566,267
BURST SYNCHRONIZATION METHOD AND APPARATUS

Leonard S. Golding, Rockville, Md., assignor to Communications Satellite Corporation Filed Oct. 30, 1968, Ser. No. 771,944
Int. Cl. H04l 7/02
U.S. Cl. 325—4 9 Claims

ABSTRACT OF THE DISCLOSURE

In a satellite communications system operating in a time division multiple access mode the burst transmit time at each station is varied in accordance with a predicted phase error. The predicted phase error is based on past phase errors, which, over a short period of time indicate the substantially linear movement of the satellite and the substantially linear variation of the phase error.

BACKGROUND OF THE INVENTION

A TDMA (time division multiple access) satellite communications system is one in which each ground station transmits a burst of information at a time such that the bursts of information transmitted from all stations in the communications network are time separated when they arrive at the satellite. The bursts are in order such that the burst from a reference or first station arrives first, followed by a burst from the second station, etc. until bursts from all stations are received. After that a burst from the reference station is again received and the process continues in this manner. The time between reference bursts is known as the frame time and the first burst thus provides a frame reference which can be used by all other stations, after receipt via the satellite for controlling the timing of their own bursts. The frame time is known because it is predetermined and the position of any stations burst with respect to the reference burst is also known. In TDMA systems of this type all stations transmit their burst to the satellite, and the satellite transponds all bursts down to all stations. Consequenly, each station receives all bursts via the satellite, including its own burst, and the received bursts are at the relative time position in which they occur in the satellite.

It is of utmost importance in such systems that the bursts from adjacent stations (stations which are adjacent in the assigned order that they transmit their respective bursts) do not overlap in the satellite. Since each station knows the proper time relation between its received burst and the received reference burst, proper time relationship can be maintained if the station burst is transmitted at a time $R_T$ which will place it at the correct time T behind the reference burst. This is complicated by the fact that the distance to the satellite is different for each station and the satellite is constantly varying in range thereby creating a variation in the relative distances between the satellite and the several stations.

The problem of properly timing the burst from a given station can be broken down into two areas the first being satellite acquisition and the second being burst synchronization. The first area concerns placing the station burst within the proper slot when the station is first turned on. The second area concerns maintaining the burst within the proper slot during station operation despite satellite movement.

A method and apparatus for performing aquisition is disclosed and claimed in U.S. patent application Ser. No. 594,830, filed Nov. 16, 1966 to John Puente and assigned to the assignee herein. The method of the above application, briefly, contemplates sending out a recognizable pulse at burst transmit time, viewing on a receiver oscilloscope the relative times of the other station bursts and said recognizable pulse after receipt via the satellite, and varying the transmit time until the recognizable pulse appears in the proper slot as viewed on the oscilloscope.

A method and apparatus for performing burst synchronization is disclosed in U.S. patent application Ser. No. 594,921, filed Nov. 16, 1966, to Ova G. Gabbard, assigned to the assignee of the present invention. The method described in the above mentioned application is performed, briefly as follows: The actual time separation between the received reference burst and the received station's own burst is detected and compared with the proper time separation between those bursts. The difference represents a phase error. The phase error is then used to vary the burst transmit time in a direction to reduce the phase error to zero.

The present invention is an improved burst synchronizing method and apparatus. It is not concerned with acquisition except in that acquisition is necessary before burst synchronization can take place.

The round trip time or transmission time for a burst to travel from station to satellite to station is approximately 300 m.s. In the method taught by Gabbard in the above mentioned patent application, the phase error which is detected is due to the position of the satellite at about 150 m.s. prior to detection. Furthermore, the correction put into the burst transmit time as a result of the phase error is not seen by the satellite until approximately 150 m.s. after transmission of the burst. Consequently, the effect of the correction takes place 300 m.s. following the existence of the condition (satellite position) which caused the phase error, and the condition will have changed during that 300 m.s. period. This only relates to the accuracy of and not the effectiveness of the Gabbard method and apparatus.

SUMMARY OF THE PRESENT INVENTION

In accordance with the present invention the burst transmit time is varied by a correction factor $\sigma$, which is based, not only on the past phase errors $x$, but also on the predicted phase error $s$, which will occur due to satellite motion 300 m.s. in the future. It is known from experience that the range to earth of a synchronous satellite varies sinusoidally, the variation having a 24 hour period and in one case approximately a 1000 mile peak-to-peak variation. Consequently, over short periods of time the satellite movement is substantially linear. This short period linearity is uitilized according to the present invention to predict the amount of delay necessary to apply to the burst transmit time to properly position the burst at the future time that it arrives at the satellite. The basic philosophy of the persent invention is as follows: Since the sattelite movement is linear, the phase error $x$, resulting from said movement also varies linearly with time. The "straight line" of phase error versus time, on a short time basis, is determined by a multiplicity of past phase error measurements. On the basis of the "straight line" the predicted phase error $s$, is determined. The predicted phase error $s$, is predicted for 300 m.s., for example, following the last measured phase error $x$. The burst transmit time is then varied by an amount of time equal to the predicted phase error.

The "straight line" is only an approximation because of existence of error in the equipment and also because the satellite movement is not perfectly linear. In order to provide the least amount of overall error in our prediction, a straight line is drawn (conceptually, not physically) through the measured phase errors in accordance with the statistical method known as the linear least squares method.

DETAILED DESCRIPTION OF THE DRAWINGS

Figure 1:
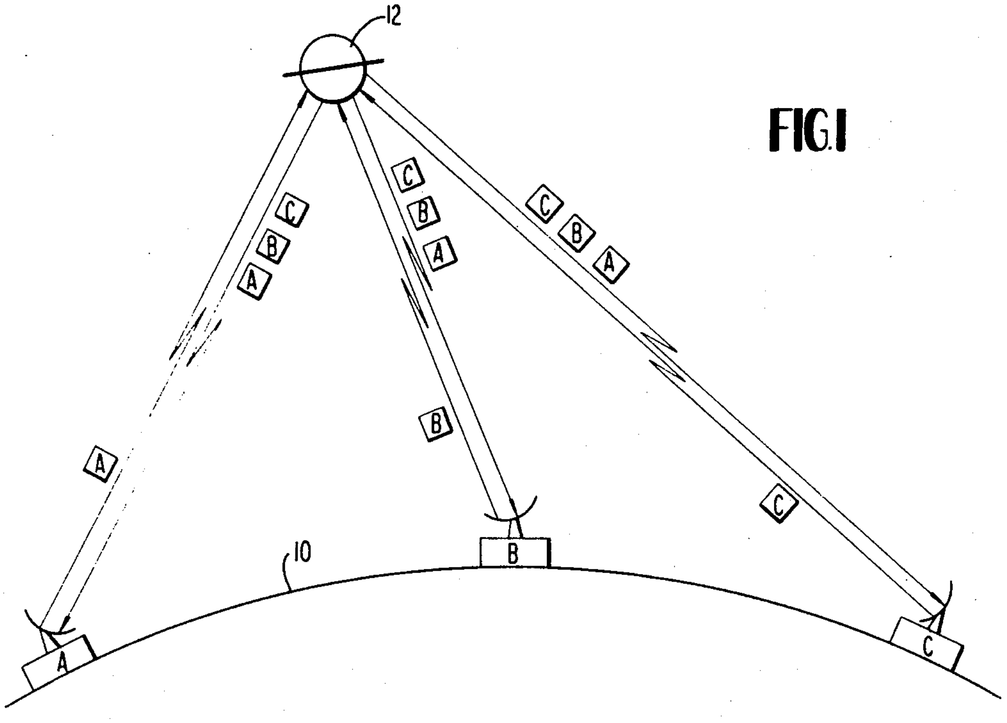
FIG. 1 illustrates a plurality of earth stations operating in a TDMA network with a transponding satellite.
Figure 2:
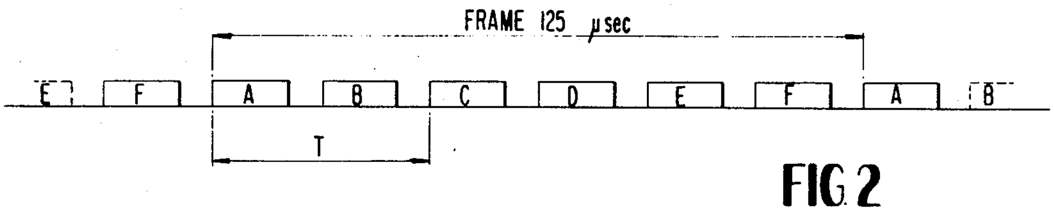
FIG. 2 illustrates a frame of station bursts.

FIG. 1 illustrates the problem to which the present invention is directed. Three ground stations, A, B, and C are shown on the earth's surface 10 for communicating with one another via the satellite 12. Throughout the description the following assumptions are made: (1) there are six stations; A–F, in the communications network, (2) the frame time period is 125 μsec.; and (3) the burst synchronization apparatus will be described for station C, the apparatus at all other stations being identical except for reference station A where synchronization apparatus is not necessary. Three of the six stations are illustrated in FIG. 1, the time format of the bursts being shown in FIG. 2. For proper TDMA operation reference station A initiates its burst periodically every 125 μsec. All other stations initiate their bursts at times which result in their bursts arriving at the satellite in the respective time positions shown in FIG. 2. Specifically, station C initiates its burst at a time $R_T+\sigma$, which time is selected to cause bursts A and C to be separated by the correct time $T_{ac}$. The time $R_T$ will be referred to as the nominal time and it is determined at acquisition. The time $\sigma$ represents the time variation of the transmit burst as determined by prediction. As illustrated in FIG. 1, each station transmits only one burst per frame but receives the entire format of bursts in the frame. With respect to the time relationship between bursts the receivers see the identical format that is seen by the satellite.

Referring now to a particular station, at station C the reference burst A is detected and the C burst is detected. The manner of detecting and identifying the bursts is known in the art and will not be discussed in detail herein. The time separation between the two bursts in a one frame period is measured. This time is referred to hereinafter as the measured time separation, $T_R$. The uncorrected phase error, $x=T_{ac}-T_R$. This means that if the burst transmit time had been altered for the prior burst by an amount of time equal to $x$ then we would not now have any phase error.

The reason why the term uncorrected phase error is used will now be explained. As a result of the synchronization process the burst transmit time is varied after each measurement, e.g. after the $i$th measurement the burst transmit time was $R_T+\sigma_i$. Consequently when we measure $x_{i+1}$, it represents an error which resulted despite our prior correction. However, for calculation we need to know the phase error which would have occurred if there was no correction, i.e. if the burst transmit time was at the nominal time $R_T$. The corrected or adjusted phase errors, $y$, are the one which are substantially linear with time and they are used to calculate our linear least squares straight line.

For a given measured phase error $x_i$, the corrected or adjusted phase error $y_i$ is :

$$y_i=x_i-\sigma_{(i-1)}$$

Figure 3:
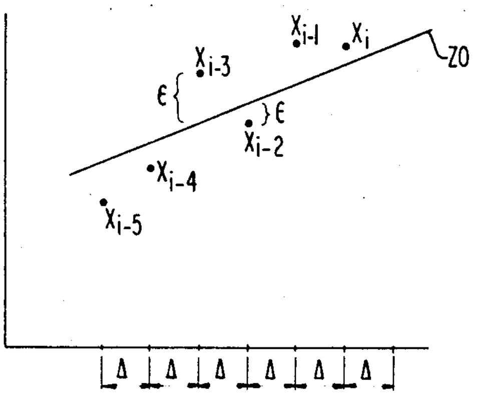
FIG. 3 is a graph which illustrates the manner in which phase error is predicted in accordance with the present invention.

A plot of a group of phase errors is illustrated in FIG. 3 wherein the position of the $x_i$'s marks represents error amplitude on the ordinate axis and time of measurement on the abscissa axis. The symbol $\Delta$ represents the period between measurements. The variation of the phase errors from a straight line path ZO is greatly exaggerated in the drawing only for the purpose of clarity. The line ZO which is drawn through the past history phase errors represents the best fit, from a statistical standpoint, of a straight line. As is well known the equation for a straight line is $$s=at+b$$

where $s$ is the value along the ordinate axis, $t$ is the value along the abscissa axis, and $a$ and $b$ are constants. For our purpose, $t$ is 300 m.s. and $s$ represents the predicted phase error. Thus to obtain $s$ it only remains for us to obtain the values of $a$ and $b$ for the line which is the "best fit." As will be apparent the so-called constants $a$ and $b$ are not really constant at all but vary each time a new phase error, $x_{i+1}$, measurement is made. This is because following each new phase error measurement a new "best fit" is required. However, it is mathematically a straight forward problem to determine values for $a$ and $b$ in terms of the measured values $\{x_i\}$ the number of measurements $n$, used to calculate the best fit, and the time separation, $\Delta$, between measurements. The determination of the linear least squares fit is mathematically based upon the minimization of the function:

$$\sum_{i=1}^{n} E_i$$

where $E_i$ is the deviation of the measurement $x_i$ from the least squares line.

It can be shown that the solution for $a$ and $b$ results in:

$$a=\frac{c_2-u_1c_1}{u_2-u_1^2}$$

$$b=\frac{u_2c_1-u_1c_2}{u_2-u_1^2}$$

where $$u_1=t_1-\frac{\Delta}{2}(n-1)$$

$$u_2=t_1^2-[\Delta\cdot t_1\cdot(n-1)]+\frac{\Delta^2}{6}(n-1)(2n-1)$$

$$c_1=\frac{1}{n}\sum_{i=1}^{n}x_i$$

$$c_2=\frac{1}{n}\sum_{i=1}^{n}x_it_i$$

It will be noted that $u_1$ and $u_2$ are fixed quantities, since $n$ and $\Delta$ are determined by the design of a system and $c_1$ and $c_2$ are functions of the measured values $x$. Consequently for a given set of measurements one can determine the predicted delay to be added to the burst transmit time. Note that with the values of $x$ given it becomes a simple matter for most any type arithmetic processor to solve for $c_1$ and $c_2$ and subsequently $a$, $b$ and then the predicted delay $s$.

The mathematical derivation of values $a$ and $b$ will be given hereinafter along with an explanation of a method for selecting the values of $\Delta$ and $n$.

Figure 4:
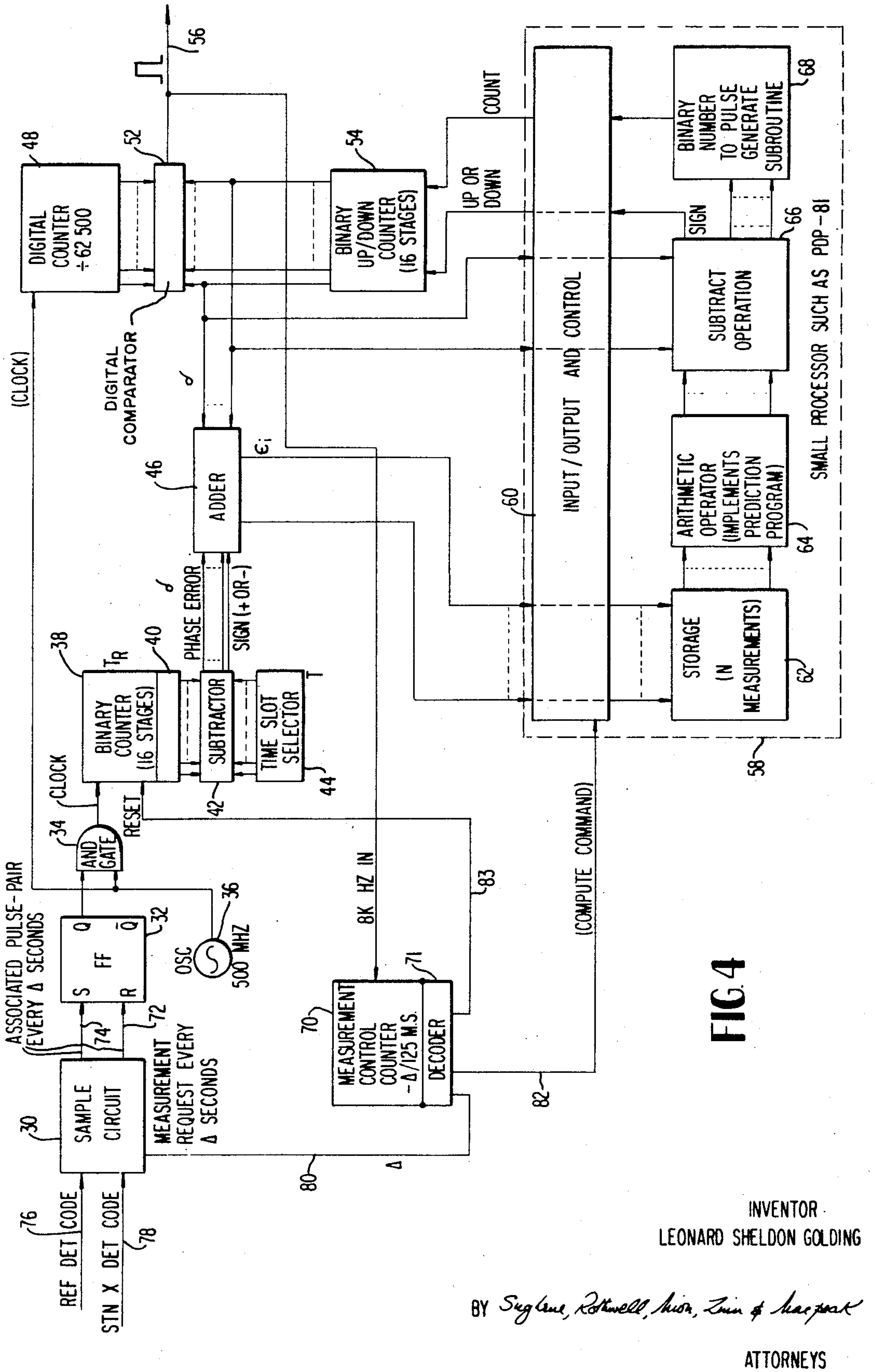
FIG. 4 is a block diagram of a preferred embodiment of the present invention.

An example of apparatus for carrying out the method of the present invention at one station is shown in FIG. 4. The values for $n$ and $\Delta$ are chosen to be $n=6$ and $\Delta=200$ m.s. The inputs to the sync apparatus are applied to a sample circuit 30 which is controlled by the sample pulses on lead 80. An input pulse on lead 76 represents the reference burst detected, and an input pulse on lead 78 represents the station C burst detected. These pulses are generated in a well known manner in response to the codes in the received reference and C station bursts respectively. Detection of the reserved C station burst only applies to station $c$. Other stations would detect their own received bursts.

The sample pulses on lead 80 are generated by a control counter 70 and a decoder 71. The counter 70 may be a binary counter and the decoder is adapted to provide output pulses on the lead lines 80, 82 and 83 in response to certain predetermined counts of counter 70. The input pulse rate to counter 70 is $8_{kHz.}$, as will be explained more fully hereafter. To provide the proper period between samples ($\Delta$=200 m.s.) the counter 70 should recycle every 1600 inputs. Thus counter 70 may be an eleven stage binary counter wired to recycle to zero following a count of 1600. The decoder 71 generates an output pulse on lead 80 once each cycle of the counter, which in this case is 200 m.s.

The time of occurrence of the sample pulses on lead 80 may correspond to a count of zero in counter 70. The pulses on leads 82 and 83, also having a period of 200 m.s., follow the sample pulses in time.

Upon receipt of a sample pulse, sample circuit 30 passes, to output lead 74, the next occurring reference burst detect pulse on lead 76 and passes, to output lead 72, the following station C burst detect pulse on lead 78. Consequently, the output pulses represent bursts in the same frame and the time separation of the bursts is equal to $T_M$, the measured time difference between reference and station C bursts.

The time $T_M$ is converted into a digital number $T_M$ by a flip-flop circuit 32, a 500 mHz. oscillator 36, an AND gate 34, and a sixteen stage binary counter 38. The binary counter 38 is reset to zero by a pulse on lead 83 and counts each cycle of the oscillator output which passes through AND gate 34. The pulses on leads 74 and 72 are applied to the SET and RESET inputs of flip-flop 32 resulting in an output Q having a duration equal to $T_M$. The latter output energizes AND gate 34 to pass clock pulses from oscillator 36 to counter 38 resulting in a count which represents the value $T_M$.

A binary time slot selector 44 is pre-wired to contain the binary equivalent of the value T which is the correct time separation between the reference and station C received bursts. The digital values T and $T_M$ are applied to a digital subtractor 42 which provides a digital output $x_i$ and a sign output representing the algebraic sign of the uncorrected phase error $x_i$. The phase $x_i$ plus the sign bit are applied to a digital adder 46. Also applied to the digital adder 46 is the sign and value of a deviation factor $\sigma_{(i-1)}$. The deviation factor $\sigma_{(i-1)}$ represents the burst transmit time correction which was made as a result of calculations following the prior sample time. The digital output and sign from digital adder 46 represents $y_i$ and the sign thereof. The latter value and sign are entered into a digital arithmetic processor 58 in response to a command input pulse on lead 82. The value and sign of $\sigma_{(i-1)}$ is also entered into the digital arithmetic processor 58. The processor 58 operates upon the last six measurements $\{x_i\}$ (note $n=6$), performing the simple arithmetic functions, given above, required to solve for $s_i$, the predicted phase error. As will be apparent to anyone of ordinary skill in the art, the arithmetic functions could be carried out by any one of a number of available processors. A detailed example of the processor 58, as shown in the drawing, includes an input/output and control circuit 60, a storage means 62 having the capacity for storing $n$ values of $x$ plus sign, an arithmetic operator 64 which performs the simple arithmetic functions to solve for $s$, a binary subtractor 66, and a binary to pulse convertor 68.

Prior to the generation of the present phase error $x_i$, the storage means 62 contains the past six phase errors, $x_{i-1}, x_{i-2}, \ldots x_{i-6}$. In response to the sample pulse on lead 80 the system begins generating the phase error $x_i$. A sufficient time following the sample pulse to enable completion of generation of $x_i$, a command pulse appears on lead 82 which gates $x_i$ plus sign into the storage means 62 and starts the arithmetic operation. The oldest value, $x_{i-6}$, is dropped and all other values of $x$ are advanced one position in storage. The arithmetic operations performed in arithmetic operator 64 result in the binary output $s_i$ which is applied as one input to the binary subtractor 66. The other input to the binary subtractor 66 is $\sigma_{(i-1)}$ which is stored in a sixteen stage up/down binary counter 54. The number held in counter 54 alters the burst transmit time as will be explained more fully hereinafter. Since the predicted phase error $s_i$ represents the amount by which the burst transmit time is to be altered the value stored in counter 54 should be updated so that it equals $s_i$. This is accomplished by subtracting $s_i$ and $\sigma_{(i-1)}$ in subtractor 66, converting the binary difference $(s_i-\sigma_{i-1})$ into a plurality of pulses, and accumulating said pulses in the counter 54. When the pulses representing $(s_i-\sigma_{i-1})$ are being counted the direction of the counter is controlled by the sign output from subtract operator 66. The new value in counter 54 is designated $\sigma_i$ and is equal to $s_i$.

The burst transmit time is controlled by the counter 54 and the oscillator 36 along with a binary counter 48 and a digital comparator circuit 52. Since the frame time in the system described is 125 $\mu$sec, corresponding to a transmit burst rate for each station of $8_{kHz.}$, the binary counter 48, which counts the cycles of the oscillator 36 output, will recycle every 125 $\mu$sec. provided it recycles after a count of 62,500. When the count value in counter 48 is equal to the value held in counter 54 the digital comparator 52 provides an output pulse on lead 56 which initiates transmission of the station $c$ burst. It thus becomes apparent that the burst transmit time is varied by the value $\sigma$ placed in counter 54.

The apparatus described above operates to synchronize the burst of a given station base on a predicted phase error at some time in the future. It is assumed the acquisition already has taken place in accordance with some acquisition method such as the one described in the Puente application mentioned above. The prior art acquisition method could be coordinated with the present invention in the following manner. When the station is ready for acquisition the sync apparatus is not yet turned on except for oscillator 36, counter 48, comparator 52 and counter 54. The initial value stored in counter 54 is $\sigma=0$. Thus every time counter 48 reaches a count of zero there is an output pulse on lead 56. The pulses on lead 56 would then initiate the low power pulses referred to in the Puente application and be delayed under control of a manually controlled variable delay means to position the received low power pulse in the correct time slot. Once this is done acquisition is complete and the sync apparatus could be turned on. All subsequent pulses on lead 56 would initiate the transmission burst after passing the aforesaid delay means. The burst transmit time is then varied from the initial or nominal time by varying the contents of counter 54.

An alternate method of varying the delay during acquisition is to control the input of counter 48 during acquisition. Speeding up the count would move the low power pulse forward in time and slowing down the count would move the lower power pulse back in time. Following acquisition the counter 48 would revert to counting at the regular rate.

It should also be noted that the value of $\sigma$ will not be changed until after the first six measurements are taken. In the specific example given this will take about 1.2 seconds following acquisition.

Although the invention has been fully disclosed above, the mathematical principle on which the invention is based will not be described.

The prediction problem we face is that of obtaining a first order predictor of the form, $$s(t)=at+b \tag{2}$$

which is in some sense a best fit to the measured data so that a good estimate of $s(t_i+T)$ can be obtained. If mean squared error is used as the criterion for best fit, then a least squares fit to the data would be optimal.

Such a least squares fit is obtained by minimizing the function, $$\text{Total error } E=f(a,b)\sum_{i=1}^{n}(at_i+b-x_i)^2 \tag{3}$$

where $x_1=x(t_1)$

The values of $a$ and $b$ which minimize $f(a, b)$ must satisfy the following equations, $$\frac{\partial f}{\partial a}=0=2\sum_{i=1}^{n}(at_i+b-x_i)t_i \tag{4}$$

$$\frac{\partial f}{\partial b}=0=2\sum_{i=1}^{n}(at_i+b-x_i) \tag{5}$$

from (4) and (5) we have the following linear equations to solve for $a$ and $b$.

$$a\cdot\sum_{i=1}^{n}t_i^2+b\sum_{i=1}^{n}t_i=\sum_{i=1}^{n}x_it_i \tag{6}$$

$$a\cdot\sum_{i=1}^{n}t_i+b\cdot n=\sum_{i=1}^{n}x_1 \tag{7}$$

we can make use of the relation $i_1=t_1\text{-}(i-l)\Delta$ to write, $$\sum_{i=1}^{n}t_i=nt_i-\Delta\sum_{i=1}^{n}i=nt_1-\frac{\Delta}{2}\cdot n(n-1) \tag{8}$$

$$\sum_{i=1}^{n}t_i^2=\sum_{i=1}^{n}(t_i^2-2\Delta t_1 i+\Delta^2 i^2)=nt_1^2-2\Delta t_i\sum_{i=1}^{n}i+\Delta^2\sum_{i=1}^{n}i^2$$

$$=nt_1^2-\Delta\cdot t_1 n(n-1)+\frac{\Delta^2}{6}\cdot n\cdot(n-1)(2n-1) \tag{9}$$

Substituting (8) and (9) into (6) and (7) we have, $$a\left[t_1^2-\Delta.t_1(n-1)+\frac{\Delta^2}{6}(n-1)(2n-1)\right]+b\left[t_1-\frac{\Delta}{2}(n-1)\right]=\frac{1}{n}\sum_{i=1}^{n}x_it_i \tag{10}$$

$$a\left[t_1-\frac{\Delta}{2}(n-1)\right]+b=\frac{1}{n}\sum_{i=1}^{n}x_i \tag{11}$$

Let us define $$u_1=t_1-\frac{\Delta}{2}(n-1)$$

$$u_2=t_1^2-[\Delta\cdot t_1\cdot(n-1)]+\frac{\Delta^2}{6}(n-1)(2n-1)$$

$$c_1=\frac{1}{n}\sum_{i=1}^{n}x_i$$

$$c_2=\frac{1}{n}\sum_{i=1}^{n}x_it_i$$

then (10) and (11) become, $$au_2+bu_1=c_2 \tag{12}$$

$$au_1+b=c_1 \tag{13}$$

Applying Cramer's rule, we have, $$a=\frac{\begin{vmatrix}c_2 & u_1\\ c_1 & l\end{vmatrix}}{\begin{vmatrix}u_2 & u_1\\ u_1 & l\end{vmatrix}}=\frac{c_2-u_1c_1}{u_2-u_1^2} \tag{14}$$

$$\text{and } b=\frac{\begin{vmatrix}u_2 & c_2\\ u_1 & c_1\end{vmatrix}}{\begin{vmatrix}u_2 & u_1\\ u_1 & l\end{vmatrix}}=\frac{u_2c_1-u_1c_2}{u_2-u_1^2} \tag{15}$$

The predicted value S $(t_1+T)=a(t_1+T)+b$, where $a$ and $b$ are given by (14) and (15).

The true value is, $s(t_1+T)=a(t_1+T)+b$

Then the mean squared prediction error is given by, $$\overline{[S(t_1+T)-s(t_1+T)]^2}=\overline{[(a-a)(t_1+T)+(b-b)]^2}\ \ldots$$

$$=\overline{(a-a)^2}(t_1+T)^2+\overline{(b-b)^2}+2)t_1+T)\overline{(a-a)(b-b)} \tag{16}$$

Substituting in for $c$ (from its definition), (12) can be written as, $$au_2+bu_1=\frac{a}{n}\sum_{i=1}^{n}t_i^2+\frac{b}{n}\sum_{i=1}^{n}t_i+\frac{1}{n}\sum_{i=1}^{n}n_it_i$$

From the definition of $u_1$ and $u_2$ we have $$au_2+bu_1=au_2+bu_1+\frac{1}{n}\sum_{i=1}^{n}n_it_1$$

and $$(a-a)u_2+(b-b)u_1=-\frac{1}{n}\sum_{i=1}^{n}n_it_i\overset{\Delta}{=}c_3$$

substituting in for $c_1$ (from its definition), (13) can be written as, $$au_1+b=\frac{a}{n}\sum_{i=1}^{n}t_i+b+\frac{1}{n}\sum_{i=1}^{n}n_i=au_1+b+\frac{1}{n}\sum_{i=1}^{n}n_i$$

and $$(a-a)u_1+(b-b)=-\frac{1}{n}\sum_{i=1}^{n}n_i\overset{\Delta}{=}c_4 \tag{18}$$

Applying Cramer's rule to (17) and (18) we have, $$(a-a)=\frac{\begin{vmatrix}c_3 & u_1\\ c_4 & l\end{vmatrix}}{\begin{vmatrix}u_2 & u_1\\ u_1 & l\end{vmatrix}}=\frac{c_3-u_1c_4}{u_2-u_1^2}$$

$$(b-b)=\frac{\begin{vmatrix}u_2 & c_3\\ u_1 & c_4\end{vmatrix}}{\begin{vmatrix}u_2 & u_1\\ u_1 & 1\end{vmatrix}}=\frac{u_2c_4-u_1c_3}{u_2-u_1^2}$$

then, $$\overline{(a-a)(b-b)}=\frac{u_2\overline{c_3c_4}-u_1\overline{c_3^2}-u_1u_2\overline{c_4^2}+u_1^2\overline{c_3c_4}}{(u_2-u_1^2)^2}$$

From the definitions of $c_3$ and $c_4$ given in (17) and (18), $$\overline{c_3c_4}=\frac{1}{n^2}\sum_{i=1}^{n}\sum_{j=1}^{n}\overline{n_in_j}\,t_i=\frac{\sigma n^2}{n^2}\sum_{i=1}^{n}t_i=\frac{\sigma n^2}{n}\cdot u_1$$

$$\overline{c_3^2}=\frac{1}{n^2}\sum_{i=1}^{n}\sum_{j=1}^{n}\overline{n_in_j}\,t_it_j=\frac{\sigma n^2}{n^2}\sum_{i=1}^{n}t_i^2=\frac{\sigma n^2}{n}\cdot u_2$$

$$\overline{c_4^2}=\frac{1}{n^2}\sum_{i=1}^{n}\sum_{j=1}^{n}\overline{n_in_j}=\frac{\sigma n^2}{n}$$

Note that $$\overline{n_in_j}=\sigma_n^2\delta_{ij}$$

since the additive noise at each measurement is independent of the noise added at other measurements.

Then, $$\overline{(a-a)(b-b)}=\frac{\sigma n^2}{n}\left[\frac{u_2u_1-u_1u_2-u_1u_2+u_1^2}{(u_2-u_1^2)^2}\right]$$

$$=-\frac{\sigma n^2}{n}\left[\frac{u_1}{(u_2-u_1^2)}\right] \tag{19}$$

Now, $$\overline{(a-a)^2}=\frac{\overline{c_3^2}-2u_1\overline{c_3c_4}+u_1^2\overline{c_4^2}}{(u_2-u_1^2)^2}=\frac{\sigma n^2}{n}\left[\frac{u_2-2u_1^2+u_1^2}{(u_2-u_1^2)^2}\right]=\frac{\sigma n^2}{n}\left[\frac{1}{(u_2-u_1^2)}\right] \tag{20}$$

and, $$\overline{(b-b)^2}=\frac{u_2^2\overline{c_4^2}-2u_1u_2\overline{c_4c_3}+u_1^2\overline{c_3^2}}{(u_2-{}_1^2)^2}=\frac{\sigma n^2}{n}\left[\frac{u_2^2-2u_1^2u_2+u_1^2u_2}{(u_2-u_1^2)^2}\right]=\frac{\sigma n^2}{n}\left[\frac{u_2}{(u_2-u_1^2)}\right] \tag{21}$$

Substituting (19), (20) and (21) into (16), we have, $$E\triangleq\overline{[S(t_1+T)-s(t_1+T)]^2}=\frac{\sigma n^2}{n(u_2-u_1^2)}\{(t+T)^2+u_2-2(t_1+T)u_1\}=\frac{\sigma n^2}{n(u_2-u_1^2)}\{[(t_1+T)-u_1]^2+(u_2-u_1^2)\}$$

now, $$t_1+T-u_1=t_1+T-\left[t_1-\frac{\Delta}{2}(n-1)\right]=T+\frac{\Delta}{2}(n-1)$$

$$u_2-u_1^2=t_1^2-\Delta\cdot t_1\cdot(n-1)+\frac{\Delta^2}{6}(n-1)(2n-1)-t_1^2+\Delta t_1(n-1)-\frac{\Delta^2}{4}(n-1)^2=\frac{\Delta^2}{24}[8n^2-12n+4-6n^2+12n-6]=\frac{\Delta^2}{24}[2n^2-2]=\frac{\Delta^2}{12}(n^2-1)$$

$$E=\frac{4\times10^{-12}}{n}\left[\frac{[350+.0625(n-1)]^2}{\frac{(1.25\times10^{-1})^2}{12}(n^2-1)}+1\right]\text{msec.}^2 \tag{22}$$

As an example consider, $\Delta=125\times10^{-6}$ seconds;
$T=350\times10^{-3}$ seconds;
$\sigma_n=2\times10^{-9}$ seconds Then (22) becomes, $$E=\frac{4\times10^{-12}}{n}\left[\frac{\frac{[350+.0625(n-1)]^2}{2}+1}{\frac{(6.25)\times10^{-4}}{12}(n^2-1)}\right](\text{milliseconds})^2$$

Figure 5:
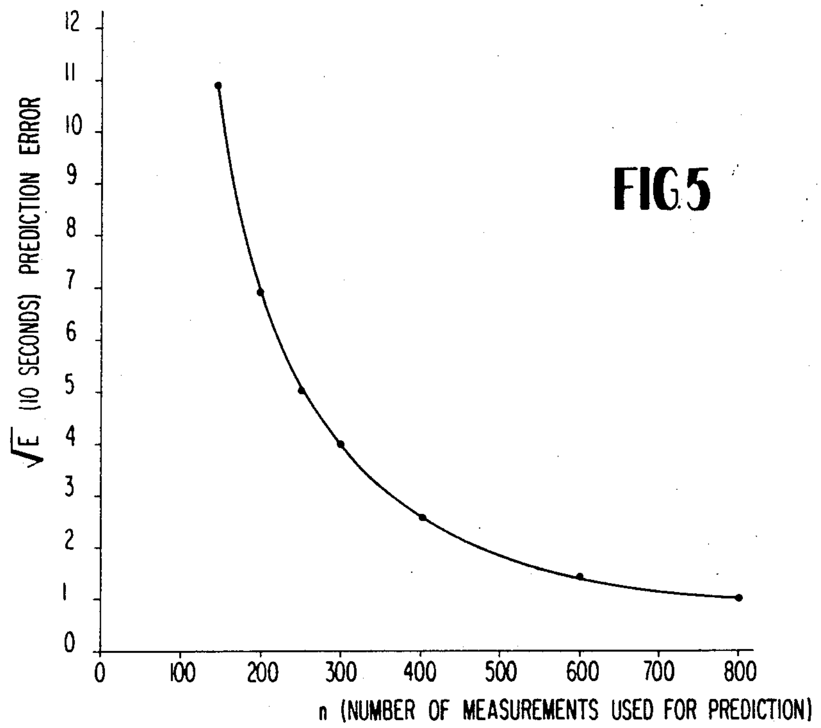
FIG. 5 is a graph of RMS prediction error versus number of measurements used for prediction.

A plot of $\sqrt{E}$ versus $n$ is shown in FIG 5. For a 2 nanosecond accuracy in predicting the value of $s(t_1+T)$, we require an $n=800$ or an observation period of 100 milliseconds.

From (14) and (15) we note that in order to implement this predictor, we need to determine $u_1$, $u_2$, $c_1$ and and $c_2$. However, $c_1$ and $c_2$ are the only terms which depend on the measured phase difference and these parameters are given by, $$c_1=\frac{1}{n}\sum_{i=1}^{n}x_i$$

$$c_2=\frac{1}{n}\sum_{i=1}^{n}x_it_i$$

which are simple operations on the measured values.

In effect, the predictor provides an estimate of the phase difference between the reference and local stations T seconds in the future, where T is the round trip time delay to the satellite. As described above, the predictor was shown to be given by $$S(t+T)=a(t+T)+b$$

If we note that $t_1=(n-1)\Delta$, where $\Delta$ equals the time between measurements, then substituting in the expressions for $a$ and $b$ derived in the previous memorandum, Equation 1 can be rewritten as $$S(t_1+T)a_1\sum_{i=1}^{n}x_i-a_2\sum_{i=1}^{n}ix_1 \tag{2}$$

where, $$a_1=\left[\frac{12}{\Delta(n^2-1)}-\frac{6}{n(n+1)}\right](T+(n-1)\Delta)+\frac{(4n-2)}{n(n+1)}-\frac{6}{n+1}$$

$$a_2=\frac{12}{\Delta n(n^2-1)}(T+(n-1)\Delta)-\frac{6}{n(n+1)}$$

As derived in the previous memorandum, the RMS prediction error is given by $$\sqrt{E}=\frac{\sigma_n}{\sqrt{n}}\left[\frac{\left(T+\frac{\Delta}{2}(n-1)\right)^2}{\frac{\Delta^2}{12}(n^2-1)}+1\right]^{1/2} \tag{3}$$

Figure 6:
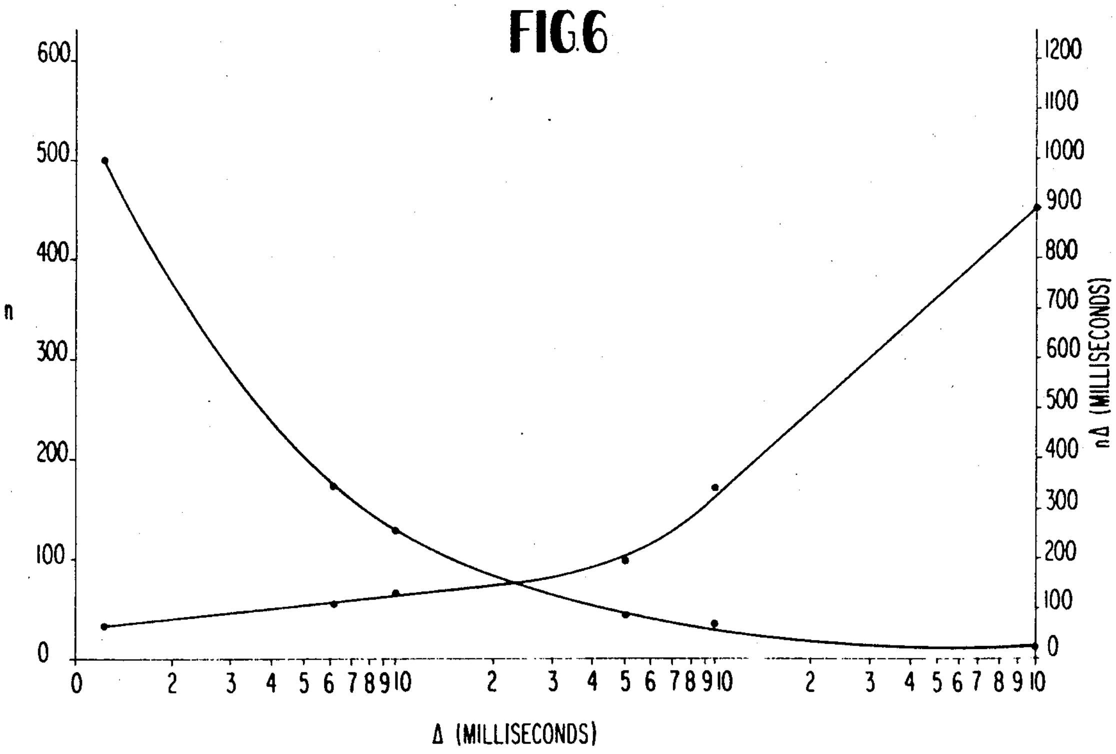
FIG. 6 is a graph illustrating the number of samples and sample intervals to achieve a prediction error equal to the standard deviation of error at each measurement.

It is evident from the above equation that a fixed RMS error can be achieved for many different combinations of $n$ and $\Delta$. FIG. 6 illustrates the variation in $n$ required to achieve an RMS prediction error equal to the standard deviation of the error at each measurement. For example, if the error at each measurement has a standard deviation of 2 nanoseconds, then the curve in FIG. 6 (labeled $n$) indicates the $n$ required to achieve an RMS prediction error of 2 nanoseconds. The smallest $\Delta$ equals 0.125 millisecond, which corresponds to taking a measurement on each successive burst in the TDMA system. To achieve the specified RMS error with this $\Delta$ we require 500 measurements. By increasing $\Delta$ to 100 milliseconds, we need only 9 measurements to achieve the same RMS errors, and for $\Delta=200$ milliseconds, we need only 6 measurements for the same error.

The total time interval over which measurements are made in order to determine the predicted value equals $n\Delta$. The curve labeled $n\Delta$ in FIG. 6 illustrates how this time varies with different combinations of $n$ and $\Delta$ needed to achieve a fixed RMS prediction error. From FIG. 6 we see that increasing $\Delta$ reduces the $n$ required to achieve a fixed RMS error but increases the $n\Delta$ required to achieve this error. Since we have assumed (see my previous memorandum) that the actual phase difference between the reference and local stations varies linearly with time, this assumption must be valid over a time interval $n\Delta+T$. Therefore, the linearity assumption must be valid over longer time intervals when larger $\Delta$'s are used. However, for synchronous satellites the linearity assumption appears to be valid over intervals of 10 minutes and greater, presenting no problem in using larger $\Delta$. The variation in RMS prediction error as a function of $n$ for fixed $\Delta=0.125$ millisecond is shown in FIG. 5.

I claim:

1. The method of varying the burst transmission time at a given station, said station being one of a network of stations operating with a transponder on a time division multiple access mode wherein each station transmits bursts of communications information which are referenced to the burst from a reference station, the method comprising (a) periodically detecting the phase error between the reference and the given station bursts, (b) adjusting said phase errors to compensate for the deviation in the burst transmit time at said given station to form adjusted phase errors, each said phase error being compensated by the deviation occurring at the time of detection of said phase error, (c) predicting the adjusted phase error for a predetermined time in the future based upon a predetermined number of past adjusted phase errors, the step of predicting being carried out anew for each new adjusted phase error, and (d) varying the burst transmit time from said given station in accordance with said predicted adjusted phase errors.

2. The method as claimed in claim 1 wherein the step of periodically detecting comprises (a) receiving at least the bursts of said reference and said given stations via said transponder, (b) periodically measuring the time difference between said reference and given station bursts occurring in a single frame, (c) subtracting each measured time difference from a standard predetermined time difference to form said phase errors.

3. The method as claimed in claim 2 wherein the step of adjusting said phase errors comprises, (a) storing the deviation factor by which said burst transmit time is adjusted, and (b) subtracting each said deviation factor from each said phase error to form said adjusted phase errors.

4. The method as claimed in claim 3 wherein the step of predicting comprises, (a) storing a predetermined number of past adjusted phase errors, (b) updating said storage in response to each new adjusted phase error, and (c) operating upon said stored adjusted phase error in accordance with a predetermined mathematical formula to obtain a predicted adjusted phase error.

5. The method as claimed in claim 4 wherein the step of varying comprises (a) varying said deviation factor so that the stored deviation factor factor equals the predicted adjusted phase errors, and (b) adjusting said burst transmit time by said stored deviation factor.

6. The method as claimed in claim 5 wherein the step of operating upon, comprises, (a) obtaining the formula for the linear least squares line based upon said stored adjusted phase errors, and (b) determining the point on said line corresponding to said predetermined time in the future.

7. The method as claimed in claim 1 wherein the step of adjusting said phase errors comprises, (a) storing the deviation factor by which said burst transmit time is adjusted, and (b) subtracting each said deviation factor from each said phase error to form said adjusted phase errors.

8. The method as claimed in claim 1 wherein the step of predicting comprises, (a) storing a predetermined number of past adjusted phase errors, (b) updating said storage in response to each new adjusted phase error, and (c) operating upon said stored adjusted phase error in accordance with a predetermined mathematical formula to obtain a predicted adjusted phase error.

9. The method as claimed in claim 1 wherein the step of varying comprises (a) varying said deviation factor so that the stored deviation factor equals the predicted adjusted phase errors, and (b) adjusting said burst transmit time by said stored deviation factor.

References Cited

UNITED STATES PATENTS

| | | | |
|---|---|---|---|
| 3,428,898 | 2/1969 | Jacobsen | 325—15 |
| 3,484,555 | 12/1969 | Ching | 179—15 |

ROBERT L. RICHARDSON, Primary Examiner

K. W. WEINSTEIN, Assistant Examiner

U.S. Cl. X.R.

179—15; 325—41